(12) United States Patent
Marinoiu et al.

(10) Patent No.: US 9,396,240 B2
(45) Date of Patent: Jul. 19, 2016

(54) EXTREME VISUALIZATION ENABLING EXTENSION FOR LARGE DATA SETS

(71) Applicants: Bogdan Marinoiu, Courbevoie (FR); Yann Le Biannic, Suresnes (FR)

(72) Inventors: Bogdan Marinoiu, Courbevoie (FR); Yann Le Biannic, Suresnes (FR)

(73) Assignee: Business Objects Software Ltd., Dublin (IE)

( * ) Notice: Subject to any disclaimer, the term of this patent is extended or adjusted under 35 U.S.C. 154(b) by 218 days.

(21) Appl. No.: 14/095,441

(22) Filed: Dec. 3, 2013

(65) Prior Publication Data
US 2015/0154270 A1 Jun. 4, 2015

(51) Int. Cl.
*G06F 17/30* (2006.01)
(52) U.S. Cl.
CPC .... *G06F 17/30563* (2013.01); *G06F 17/30572* (2013.01)
(58) Field of Classification Search
CPC combination set(s) only.
See application file for complete search history.

(56) References Cited

U.S. PATENT DOCUMENTS

| 8,572,122 B2 * | 10/2013 | Cras | G06F 17/30 707/791 |
| 2012/0054658 A1 * | 3/2012 | Chuat | G06F 17/30247 715/771 |
| 2013/0173591 A1 * | 7/2013 | Cras | G06F 17/30 707/718 |
| 2013/0330008 A1 * | 12/2013 | Zadeh | G06N 7/02 382/195 |

OTHER PUBLICATIONS

Communication pursuant to Article 94(3) EPC mailed Mar. 2, 2016; for related EP Application No. 14004059.3-1507; 7 pages.

* cited by examiner

*Primary Examiner* — Shyue Jiunn Hwa
(74) *Attorney, Agent, or Firm* — Fish & Richardson P.C.

(57) ABSTRACT

The present disclosure describes methods, systems, and computer program products for enabling extreme visualization for large data sets stored in a database. One computer-implemented method includes receiving a request for an input schema to feed to a data specification language (DaSL) and a metadata outline of typed objects exposed by a database view identified in the request, requesting extraction of the input schema and metadata outline from the database, creating an instance of a DaSL compiler based upon the input schema, generating, by a computer, a DaSL query corresponding to objects selected from the metadata outline, requesting compilation of the DaSL query, and receiving a calculation plan and topology cursors responsive to the compilation of the DaSL query.

15 Claims, 5 Drawing Sheets

100

| | NAME | AGE | RES DAYS |
|---|---|---|---|
| 1 | Goldschmidt | 55.0 | 3.0 |
| 2 | Baker | 64.0 | 4.0 |
| 3 | Swensen | 74.0 | 3.0 |
| 4 | Michaud | 22.0 | 3.0 |
| 5 | Robert | 38.0 | 1.0 |
| 6 | Martin | 42.0 | 12.0 |
| 7 | Piaget | 56.0 | 8.0 |
| 8 | Gentil | 67.0 | 1.0 |
| 9 | Dupont | 72.0 | 14.0 |
| 10 | Edwards | 18.0 | 10.0 |
| 11 | Marlow | 29.0 | 3.0 |
| 12 | Wilson | 34.0 | 15.0 |
| 13 | McCartney | 47.0 | 5.0 |
| 14 | Keegan | 56.0 | 10.0 |
| 15 | Jones | 68.0 | 6.0 |
| 16 | Hopkins | 73.0 | 1.0 |
| 17 | Schiller | 24.0 | 10.0 |
| 18 | Dunnstein | 36.0 | 2.0 |
| 19 | Weimar | 45.0 | 13.0 |
| 20 | Schultz | 59.0 | 2.0 |
| 21 | Titeman | 63.0 | 8.0 |
| 22 | Reinman | 72.0 | 4.0 |
| 23 | Kamimuna | 38.0 | 2.0 |
| 24 | Mukumoto | 59.0 | 4.0 |
| 25 | Oneda | 68.0 | 4.0 |

FIG. 1

|   | GID | MININTERVAL | Res Days |
|---|---|---|---|
| 1 | 0.0 | 18.0 | 7.67 |
| 2 | 1.0 | 26.0 | 3 |
| 3 | 2.0 | 34.0 | 6.67 |
| 4 | 3.0 | 42.0 | 10 |
| 5 | 4.0 | 50.0 | 10.5 |
| 6 | 5.0 | 58.0 | 6 |
| 7 | 6.0 | 66.0 | 6.6 |

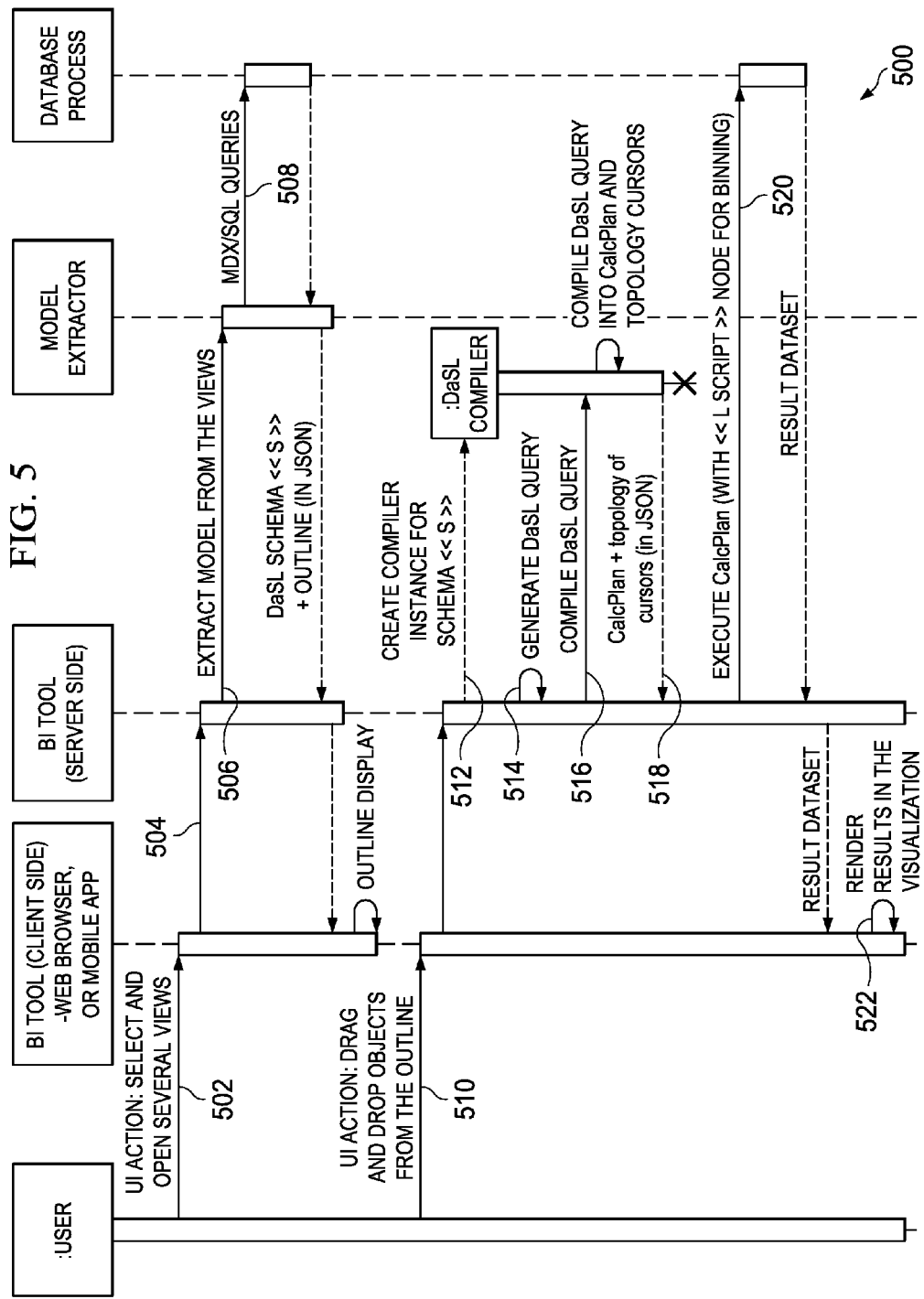

EXTREME VISUALIZATION ENABLING EXTENSION FOR LARGE DATA SETS

BACKGROUND

Creating visualizations of large data sets stored in a database is a difficult problem. Resolution and pixel count limit the amount of data points that can be displayed on any visual display. While modern mobile devices, for example smartphones and tablet computers, have the capability to provide a rich and diverse set of data to an end user, smaller displays and a reduced pixel count further exacerbate the problem. Limited visual acuity of the human eye can reduce massive numbers of data point plotting symbols on a visual display into an uninterpretable collection of data points. In addition, available network bandwidth, for example bandwidth associated with a cellular network, can act as a bottleneck when attempting to transfer a large data set to a mobile device for visualization. Various methods of what is called "extreme visualization" can be used to attempt to visualize the large data sets as various types of graphs. For example, a common method is to aggregate many tuples, or sets of data elements, into separate bins, each bin representing a data point that is the average of a certain number of data points in the large data set. The bins are then visualized on a display as a graph to represent the data. Other methods include kernel density estimation and cumulative distribution functions. The classic approach to performing this type of data aggregation is using non-real time, complex, data-, processing-, and schema-intensive database queries, for example queries in structured query language (SQL), to process the data for display.

SUMMARY

The present disclosure relates to computer-implemented methods, computer-readable media, and computer systems for enabling extreme visualization for large data sets stored in a database. One computer-implemented method includes receiving a request for an input schema to feed to a data specification language (DaSL) and a metadata outline of typed objects exposed by a database view identified in the request, requesting extraction of the input schema and metadata outline from the database, creating an instance of a DaSL compiler based upon the input schema, generating, by a computer, a DaSL query corresponding to objects selected from the metadata outline, requesting compilation of the DaSL query, and receiving a calculation plan and topology cursors responsive to the compilation of the DaSL query.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising selecting the database view associated with the database using a graphical user interface database.

A second aspect, combinable with any of the previous aspects, wherein the extraction of the input schema and metadata outline is performed by a model extraction component.

A third aspect, combinable with any of the previous aspects, further comprising transmitting the metadata outline for display.

A fourth aspect, combinable with any of the previous aspects, further comprising compiling the DaSL query into a calculation plan and topology cursors used to visualize data.

A fifth aspect, combinable with any of the previous aspects, further comprising executing the calculation plan in the database.

A sixth aspect, combinable with any of the previous aspects, further comprising initiating visualization of a dataset responsive to the execution of the calculation plan using the topology cursors.

The subject matter described in this specification can be implemented in particular implementations so as to realize one or more of the following advantages. First, a business intelligence data specification language (DaSL) can be leveraged to efficiently build expressive applications for extreme visualization of data. (DaSL) is based on an input schema extracted from a data model exposed by the data source and its simplified expressions can be compiled into native constructs supported by a database. In exemplary implementations, the large data sets are stored and queries processed by an in-memory database. In other implementations, any database can be used, but performance may suffer in comparison to the use of the in-memory database. Second, DaSL queries are simple and concise. For example, DaSL also has a dedicated binning operator to simplify performance of data aggregation without creating complex queries with multiple resource intensive operations. Third, DaSL queries are robust with respect to some changes of an underlying database schema because they are closer to the semantics of the application. For example, a DaSL query involves only attributes not database tables. Fourth, DaSL is resource space efficient, in the sense that resource space allocated for the input is linear in the number of bins and independent of the size of the input. Fifth, the binning operator is also time efficient since only two scans of the input node's table are enough. Fourth, an in-memory database provides performance necessary to provide extreme data visualization in real-time. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1 illustrates an example screenshot of a portion of an example large data set table stored in a database according to an implementation.

FIG. 5 is a sequence diagram illustrating a method for enabling extreme visualization for large data sets stored in a database according to an implementation.

Like reference numbers and designations in the various drawings indicate like elements.

DETAILED DESCRIPTION

Figures 2A, 2B:
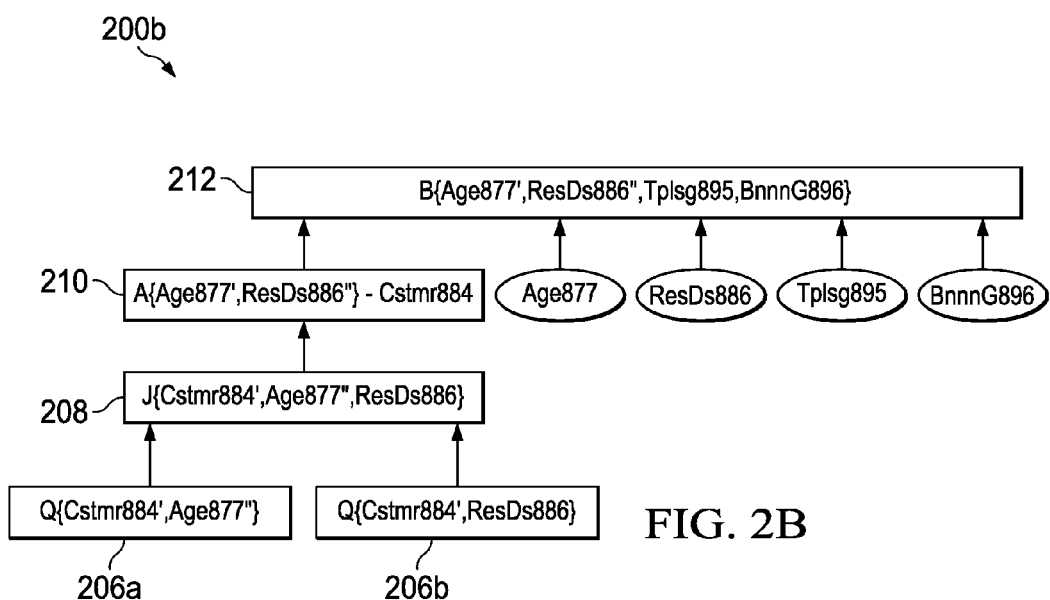
FIG. 2A illustrates an example screenshot of a portion of a table using the data of FIG. 1 generated by the classic approach according to an implementation.
FIG. 2B illustrates an example calculation plan for a data specification language (DaSL) query according to an implementation.

This disclosure generally describes computer-implemented methods, computer-program products, and systems for enabling extreme visualization for large data sets stored in a database. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Creating visualizations of large data sets stored in a database is a difficult problem. Resolution and pixel count limit the amount of data points that can be displayed on any visual display. While modern mobile devices, for example smartphones and tablet computers, have the capability to provide a rich and diverse set of data to an end user, smaller displays and a reduced pixel count further exacerbate the problem. Limited visual acuity of the human eye can reduce massive numbers of data point plotting symbols on a visual display into an uninterpretable collection of data points. In addition, available network bandwidth, for example bandwidth associated with a cellular network, can act as a bottleneck when attempting to transfer a large data set to a mobile device for visualization. Various methods of what is called "extreme visualization" can be used to attempt to visualize the large data sets as various types of graphs. For example, a common method is to aggregate many tuples, or sets of data elements, into separate bins, each bin representing a data point that is the average of a certain number of data points in the large data set. The bins are then visualized on a display as a graph to represent the data. Other methods include kernel density estimation and cumulative distribution functions. The classic approach to performing this type of data aggregation is using non-real time, complex, data-, processing-, and schema-intensive database queries, for example queries in structured query language (SQL), to process the data for display.

The generation of SQL queries is not optimal because needed resource space for SQL processing is linear in proportion to the size of the input. With large data sets, prohibitively large resource spaces can be required and performance can be adversely affected. Moreover, creating a template to enhance SQL generation is not a trivial task, at least because a template is very sensitive to database schema alterations. For example, any changes to the underlying schema would result in necessary changes to any SQL query affected by the schema change. A more efficient way to enable extreme visualization for large data sets stored in a database is needed.

As described above, extreme visualization means aggregation of many tuples of data in a reduced number of bins. For example, the aggregation typically uses SQL aggregation functions like SUM, AVG (or their running counterparts (e.g., RUNNING SUM) to compute meaningful visualization graphs. In order to mitigate/eliminate the above-described shortcomings of this approach, the DaSL language is used to provide enhanced enablement of extreme visualization for large data sets stored in a database. DaSL provides concise and simplified query language support where the primitive queries are compiled into some language construct supported by a database, for example SQL or the L programming language for conventional or in-memory databases, respectively. In the case of an in-memory database, the enhanced performance typically provided by the in-memory database as compared to a conventional database can provide real-time processing in some implementations.

An example will be instructive. Consider a tourism agency that organizes holidays in resorts. This tourism agency has a base of customers that have made reservations, organized as a table with customer details (age, name) and the number of days each customer has reserved. FIG. 1 illustrates an example screenshot 100 of a portion of an example large data set table stored in a database according to an implementation. The manager of the tourism agency wants to see if there is a correlation between the age of the customers and the number of days they have reserved. In order to solve this question, the manager considers N age intervals, starting with the minimum age and ending with the maximum age of the customers.

The Classic Approach

This question is typically solved in SQL with a query similar to this:

```
SELECT GID,
    (MinAge + (GID*(MaxAge−MinAge)/NBINS)) AS MinInterval,
    TO_DECIMAL(AVG(AllResDays), 3, 2) AS "Res Days"
FROM    (
    SELECT (CASE
                WHEN FLOOR(((Age − MinAge)*NBINS)/
(MaxAge−MinAge))<NBINS
                THEN FLOOR(((Age − MinAge)*NBINS)/
                    (MaxAge−MinAge))
                    ELSE NBINS −1
        END
    ) AS GID,
    AllResDays
    FROM
    (   SELECT Age, SUM(Days) AS AllResDays FROM
"CUSTOMER_TABLE"
        GROUP BY Age
    )
    )
GROUP BY GID
    ORDER BY MinInterval;
```

Note that, in this example, it is assumed that the minimum/maximum ages of Customers (i.e., MinAge/MaxAge) have already been computed, and only the principal part of the SQL query is presented. The query cuts the MinAge . . . MaxAge interval in N equal-sized intervals and assigns each tuple representing a Customer to one of the intervals (i.e., the Bin) by adding to the tuple a Group ID (GID) value. Only for the last interval, as an exception, the MaxAge value is added to the $N^{th}$ interval, labeled N−1. Then, for every Bin an average value of Reservation Days is computed. Additionally, the starting age of each interval (the MinInterval) is computed and presented in a separate column. FIG. 2A illustrates an example screenshot 200a of a portion of a table using the data of FIG. 1 generated by the classic approach according to an implementation. As can be seen, there are seven intervals 202 and the added GID value is in column 204.

There are several issues with this approach. First, the query is relatively complex and difficult to construct, read, and/or maintain. Creating a template for SQL generation of a query this complex is not a trivial task. Second, this query is also very sensitive to database schema alterations and even a minor database schema change could require maintenance on multiple queries and/or introduce hard to find errors into query results. Third, the GID column needs to be created—adding a linear resource space cost relative to the size of the original table.

Enhanced Approach Using DaSL and in-Memory Database

With an L-based implementation with an in-memory database, the GID value does not need to be generated. Only an additional space of N cells (initialized to 0) is needed. The L-program associated with the in-memory database scans the table once, and for each tuple computes the index of the bin, say k, reads the value in the kth cell and updates it. It then computes the average by taking into account the contribution to it of the Res Days value in the current tuple. So only an additional constant space is needed—since the number of bins is considered a parameter. An additional scan of the table is needed to compute the MinAge/MaxAge values.

In the enhancement, this L-program is mapped to a specific operator in DaSL and is exposed using the DaSL BINS keyword:

BINS(Customer, (Age, 7), FN_AVG([Res Days]));

The L-program is generated automatically from the DaSL query by a calculation engine (not illustrated) associated with the database. The generated L-program is then dynamically compiled at query runtime and executed to retrieve data from the database conforming to the request presented by the DaSL query. As will be appreciated by those of skill in the art, the L-program can be structured in any appropriate computer language. In some implementations, the L-program can be implemented as a native C/C++ or other compiled language so dynamic compilation is not necessary. The DaSL input schema is automatically extracted from views/database tables and stores bindings between attributes used by DaSL and the column names.

In some implementations, the DaSL compiler has two inputs: 1) the DaSL query and 2) describing all the available attributes (e.g., "Age"), their bindings (e.g., database view and column(s) within this view that contains values for "Age"), and their dependencies (e.g., each "Customer" has an "Age" property, from one or many "Customers" can be aggregated a "ResDays" measure). From these 2 inputs, the DaSL compiler generates a calculation plan which is a direct acyclic graph of calculation nodes. A calculation node has one or many tables as inputs, and produces one table as output. The L-Script node is one of these nodes. It takes an input table with one or many quantified dimensions (e.g., "Customer" is quantified by "Age"), one or many measures (e.g., "ResDays"), and produces an output table where the dimensions are split into bins (each bin has a low value and an index), and the measures are aggregated on all values inside each bin. The name of columns come either from database views or from temporary tables (outcome of previous operators) so they are either known by the compiler from binding information, or automatically generated.

An example query plan for the example DaSL query can resemble that illustrated in FIG. 2B. FIG. 2B illustrates an example calculation plan for a data specification language (DaSL) query according to an implementation. From bottom to top:

Two "Query" nodes 206a/b: the left query node 206a requests the list of distinct (Customer, Age) tuples from the database, the right query node 206b requests the total number of reservation days per customer The "Join" node 208 joins the query nodes 206a/b on the Customer identifier The "Aggregation" node 210 aggregates the "ResDays" measure on each distinct value of "Age" (e.g. 18, 20, 24, . . . 74)

The "Binning" node 212 is a L-Script that will compute 7 same-size intervals on "Age", from the min computed value (e.g. 18) to the max computed value (e.g. 74), and will further aggregate "ResDays" interval by interval The L-script node is generated by the DaSL compiler with the appropriate list and types of dimensions and measures.

It should be apparent that the example DaSL query is fairly simple and concise. The DaSL query is also robust with respect to some changes of a database schema because the DaSL query is closer to the semantics of the application. For example, the DaSL query involves only attributes (Customer, Age, Res Days, etc.) and not database tables.

An example L-program representing the example DaSL query above could be similar to:

```
export Void main(Table<NullTimestamp "record_timestamp",
NullDouble
"dlr_trans_amt"> "facts" inData, Table<NullTimestamp
"record_timestamp", NullInt32
"groupId", NullDouble "dlr_trans_amt"> "out_data" & outData) {
Column<NullTimestamp> dimensionIn =
inData.getColumn<NullTimestamp>("record_timestamp");
Column<NullDouble>measureIn0 =
inData.getColumn<NullDouble>("dlr_trans_amt");
Column<NullInt32>groupOut =
outData.getColumn<NullInt32>("groupId");
Column<NullTimestamp >dimensionOut =
outData.getColumn<NullTimestamp>("record_timestamp");
Column<NullDouble>measureOut0 =
outData.getColumn<NullDouble>("dlr_trans_amt");
Timestamp minRange;
Timestamp maxRange;
Bool isEmpty = true;
Size max = inData.getSize( );
Size curr = 0z;
while(curr < max) {
  if (!dimensionIn.isNull(curr)) {
    Timestamp current = dimensionIn.getElementValue(curr);
    if (isEmpty) {
      isEmpty = false;
      minRange = current;
      maxRange = current;
    } else {
      if (current < minRange) {minRange = current; }
      if (current > maxRange) { maxRange = current; }
    }
    curr = curr.next( );
  }
}
if (isEmpty) {
  return;
}
Date maxDate = Date(maxRange.getYear( ), maxRange.getMonth( ),
maxRange.getDay( ));
Date minDate = Date(minRange.getYear( ), minRange.getMonth( ),
minRange.getDay( ));
Int32 minHour = minRange.getHour( );
Int32 minMinute = minRange.getMinute( );
Int32 minSecond = minRange.getSecond( );
Int32 range = maxDate.daysFrom(minDate) * 86400 + 60 *
(60 * (maxRange.getHour( ) – minHour) + (maxRange.getMinute( ) –
minMinute)) + maxRange.getSecond( ) – minSecond;
Size inputRowCount = inData.getSize( );
Size outputRowCount = 100z;
Size rowOut = 0z;
Int32 i = 0;
measureOut0.setSize(outputRowCount);
while(i < 100) {
  groupOut.setElementValue(rowOut, i + 1);
  dimensionOut.setElementValue(rowOut,
  minRange.addSeconds(range * i / 100));
```

```
rowOut = rowOut.next( );
i = i + 1;
}
Size rowIn = 0z;
while(rowIn < inputRowCount) {
  if (!dimensionIn.isNull(rowIn)) {
    Timestamp current = dimensionIn.getElementValue(rowIn);
    Date currentDate = Date(current.getYear( ), current.getMonth( ),
current.getDay( ));
    Int32 elapsed = currentDate.daysFrom(minDate) * 86400 + 60 *
(60 * (current.getHour( ) – minHour) + (current.getMinute( ) –
minMinute)) + current.getSecond( ) – minSecond;
    Int32 ratio = (100 * elapsed) / range;
    if (ratio >= 100) { ratio = 100 – 1; }
    rowOut = Size(ratio);
  if (measureOut0.isNull(rowOut)) {
    measureOut0[rowOut] = measureIn0[rowIn];
  } else {
    measureOut0[rowOut] = measureOut0[rowOut]+ measureIn0[rowIn];
  }
  }
  rowIn = rowIn.next( );
}
}
```

In the example the L-program splits a dimension ("record_timestamp") into 100 intervals (e.g., binning of the dimension), between the minimum and maximum values encountered in the input table ("facts") and the L-program aggregates a measure ("dlr_trans_amt") on the split dimension, and writes the results in an output table ("out_data"). As will be appreciated by those of skill in the art, the above-presented code is just an example of one possible implementation of software to perform a particular function. The above-presented code example is not intended to be limiting in any way.

Figure 3:
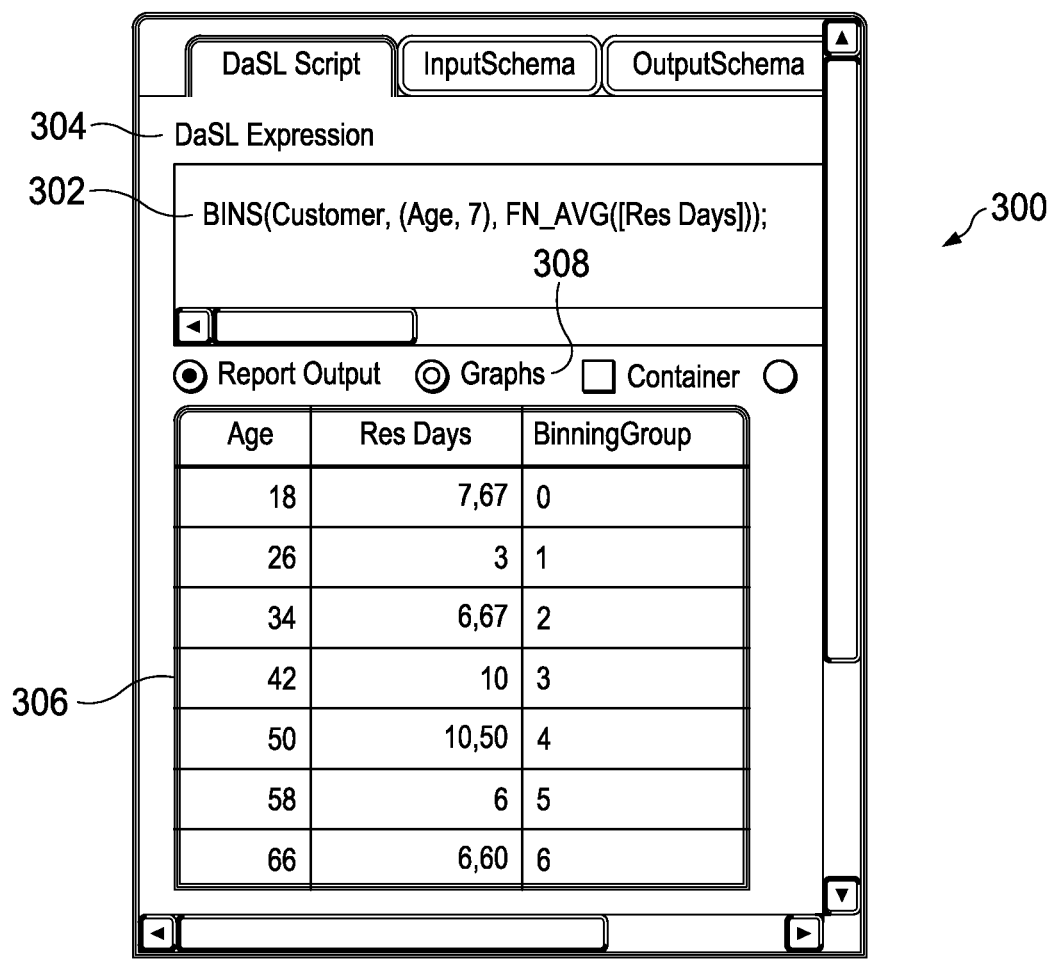
FIG. 3 illustrates an example screenshot of an input DaSL query according to an implementation.

FIG. 3 illustrates an example screenshot 300 of an input DaSL query according to an implementation. As illustrated, the DaSL query 302 is entered into a DaSL Expression input field 304. The report output of the DaSL query 302 is presented in output area 306. As shown, a graph representing the output data presented in an extreme visualization can also be presented using selection 308. Those of skill in the art will appreciate that the illustrated user interface (UI) display and/or fields are presented for example only and that UIs consistent with this disclosure can be presented in many different forms/functionalities without departing from the scope of the disclosure.

The described concept of binning can be easily generalized using DaSL and several binning criteria can be considered. For example, besides the Age considered above, one may consider the annual salary of the Customer, if such information is available. In this case the number of Bins is the product of the number of intervals required for each criterion. The following DaSL query illustrates 10*20=200 bins:

BINS(Customer, (Age, 10, Revenue, 20), FN_AVG([Res Days]));

The only requirement is that a notion of distance be available for each of these criteria, so that a notion of interval may exist as well.

Sectioned reports can also be generalized. For example, suppose that the average Reservation Days per City of origin of Customers is desired. A DaSL query similar to the following could be used:

BINS(Customer, (Age, 10, Revenue, 20), FN_AVG([Res Days])) PER City;

In this case the additional space required is #Bins multiplied by the number of Sections (i.e., the number of Cities). The time-complexity stays the same and only two table scans are necessary.

As will be appreciated by those of skill in the art, the above-provided examples are simplistic in nature and are presented only to illustrate concepts. Actual implementations can be more complex in nature, for example an actual scenario could consider the representation over time of average values for millions of receipts.

Figure 4:
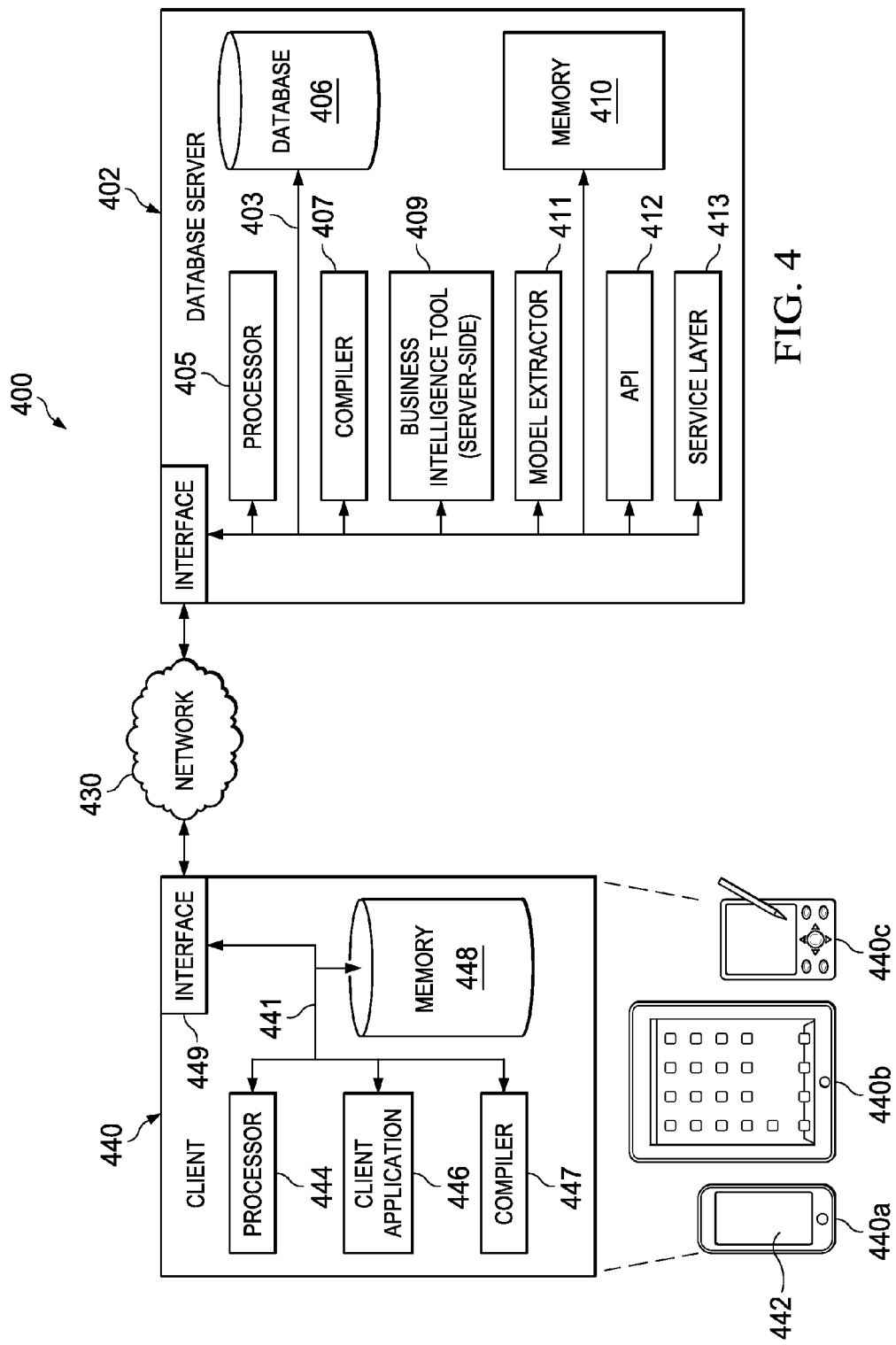
FIG. 4 is a block diagram illustrating an example distributed computing system for enabling extreme visualization for large data sets stored in a database according to an implementation.

FIG. 4 is a block diagram illustrating an example distributed computing system (EDCS) 400 for enabling extreme visualization for large data sets stored in a database according to an implementation. The illustrated EDCS 400 includes or is communicably coupled with a database server (DBS) 402 and a client 440 that communicate across a network 430.

At a high level, the DBS 402 is an electronic computing device operable to receive, transmit, process, store, or manage data and information associated with the EDCS 400 using a database 406. In exemplary implementations, the database 406 is an in-memory database. An in-memory database 406 is a high-performance database management system (DBMS) that primarily relies on volatile electronic memory, such as random access memory (RAM), as opposed to magnetic, optical, removable, or other suitable non-electronic memory, for storage, retrieval, and processing of data. The reliance on electronic memory allows, in some implementations, for near-real-time aggregation, replication, synchronization, and processing of data. In some implementations, a persistency layer ensures that a copy of the in-memory database is maintained on non-volatile magnetic, optical, removable, or other suitable non-electronic memory in the event of a power or other system failure in order to allow recovery of the in-memory database. In other implementations, the database 406 can be a conventional database primarily relying on non-volatile magnetic, optical, removable, or other suitable non-electronic memory, for storage, retrieval, and processing of data. In some implementations, database server 402 can contain both a conventional database and an in-memory database that can share storage, processing, and other appropriate database functions.

The DBS 402 is responsible for receiving, among other things, requests and content from one or more client applications 446 associated with the client 440 of the EDCS 400 and responding to the received requests. In addition to requests received from the client 440, requests may also be sent to the DBS 402 from internal users, external or third-parties, other automated applications, as well as any other appropriate entities, individuals, systems, or computers. In some implementations, various requests can be sent directly to DBS 402 from a user accessing DBS 402 directly (e.g., from a server command console or by other appropriate access method). According to some implementations, the DBS 402 may also include or be communicably coupled with an e-mail server, a web server, a caching server, a streaming data server, a business intelligence (BI) server, and/or other server.

Each of the components of the DBS 402 can communicate using a system bus 403. In some implementations, any and/or all the components of the DBS 402, both hardware and/or software, may interface with each other and/or the interface 404 over the system bus 403 using an application programming interface (API) 412 and/or a service layer 413. The API 412 may include specifications for routines, data structures, and object classes. The API 412 may be either computer-language independent or dependent and refer to a complete interface, a single function, or even a set of APIs. The service layer 413 provides software services to the EDCS 400. The functionality of the DBS 402 may be accessible for all service consumers using this service layer. Software services, such as those provided by the service layer 413, provide reusable, defined business functionalities through a defined interface.

For example, the interface may be software written in JAVA, C++, or other suitable language providing data in extensible markup language (XML) format or other format (e.g., JSON).

While illustrated as an integrated component of the DBS 402 in the EDCS 400, alternative implementations may illustrate the API 412 and/or the service layer 413 as stand-alone components in relation to other components of the EDCS 400. Moreover, any or all parts of the API 412 and/or the service layer 413 may be implemented as child or sub-modules of another software module, enterprise application, or hardware module without departing from the scope of this disclosure. For example, the API 412 could be integrated into the compiler 407.

The DBS 402 includes an interface 404. Although illustrated as a single interface 404 in FIG. 4, two or more interfaces 404 may be used according to particular needs, desires, or particular implementations of the EDCS 400. The interface 404 is used by the DBS 402 for communicating with other systems in a distributed environment—including within the EDCS 400—connected to the network 430; for example, the client 440 as well as other systems communicably coupled to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated EDCS 400.

The DBS 402 includes a processor 405. Although illustrated as a single processor 405 in FIG. 4, two or more processors may be used according to particular needs, desires, or particular implementations of the EDCS 400. Generally, the processor 405 executes instructions and manipulates data to perform the operations of the DBS 402. Specifically, the processor 405 executes the functionality required for enabling extreme visualization for large data sets stored in a database according to an implementation.

The DBS 402 also includes a memory 410 that holds data for the DBS 402, client 440, and/or other components of the EDCS 400. Although illustrated as a single memory 410 in FIG. 4, two or more memories may be used according to particular needs, desires, or particular implementations of the EDCS 400. While memory 410 is illustrated as an integral component of the DBS 402, in alternative implementations, memory 410 can be external to the DBS 402 and/or the EDCS 400.

The compiler 407 is any software application or set of applications that transforms source code written in a programming language into another computer language. The compiler 407 provides functionality to translate DaSL queries entered using a client application into code executable by the database 406, for example L code or SQL script for an in-memory or conventional database, respectively. The compiler 407 can provide lexical analysis, preprocessing, parsing, semantic analysis (syntax-directed translation), code generation, and/or code optimization. The compiler 407 provides compiled code to the database 406 or to one or more applications (not illustrated) that execute the compiled code on the database 406.

Although illustrated as a single compiler 407, the compiler 407 may be implemented as multiple compilers 407. In addition, although illustrated as integral to the DBS 402, in alternative implementations, the compiler 407 can be external to the DBS 402 and/or the EDCS 400 (e.g., wholly or partially executing on the client 440, other DBS 402 (not illustrated), or some computing system (not illustrated) accessible by network 130). In some implementations, the compiler 407 may integral to the database 406.

In some implementations, a particular compiler 407 may operate in response to and in connection with at least one request received from other compilers 407, other components (e.g., software and/or hardware modules) associated with another DBS 402, and/or other components of the EDCS 400 (whether illustrated or not). In some implementations, the compiler 407 can be accessed and executed in a cloud-based computing environment using the network 430. In some implementations, a portion of a particular compiler 407 may be a web service associated with the compiler 407 that is remotely called, while another portion of the compiler 407 may be an interface object or agent bundled for processing by any suitable component of the EDCS 400. Moreover, any or all of a particular compiler 407 may be a child or sub-module of another software module or application (not illustrated) without departing from the scope of this disclosure. Still further, portions of the particular compiler 407 may be executed or accessed by a user working directly at the DBS 402, as well as remotely at a corresponding client 440. In some implementations, the DBS 402 or any suitable component of DBS 402 or the EDCS 400 can execute the compiler 407. In some implementations, the compiler 407 is packaged in a library running in a database 406 script engine (not illustrated). In some implementations, database processes run in a database 406 index server (not illustrated).

The DBS 402 also hosts one or more server-side portions of a BI tool 409. In some implementations, the BI tool 409 is executed by a processing engine (not illustrated) associated with the database. In other implementations, the BI tool 409 can run independently or be executed by one or more other components of the EDCS 400.

The model extractor 411 is any application that can extract an input schema for the DaSL language and an outline (a list of typed objects exposed by the views) of the metadata of database views. The model extractor exposes elements of database views (e.g., database fields) as objects of the DaSL input schema (e.g., DaSL attributes and dependencies between these attributes). It binds the DaSL attributes to the database fields, such that the result of the DaSL query compilation—a calculation plan—can be transformed into database native queries addressing database objects that can be executed by the database. In some implementations, the model extractor 411 is executed by a processing engine (not illustrated) associated with the database. In other implementations, the model extractor 411 can run independently or be executed by one or more other components of the EDCS 400.

The client 440 may be any computing device operable to connect to or communicate with at least the DBS 402 and providing functionality for enabling extreme visualization for large data sets stored in a database according to an implementation. In general, the client 440 comprises an electronic computing device operable to receive, transmit, process, visualize, and/or store any appropriate data associated with the EDCS 400, for example, the database 406, compiler 407, and the like. More particularly, among other things, the client 440 can collect content from the client 440, for example DaSL code, and upload the collected content to the DBS 402 for integration into and processing by the compiler 407 and/or database 406. The client typically includes a processor 444, a client application 446, compiler, a memory 448, and/or an interface 449 interfacing over a system bus 441.

The client application 446 is any type of application that allows the client 440 to navigate to/from, request, view, create, edit, delete, administer, and/or manipulate content associated with the DBS 402, include visualizing large data set data received from the DBS 402 responsive to a DaSL query. For example, the client application 446 can present GUI displays and associated data to a user (in some implementations generated by the compiler 447/407), accept user input (e.g., DaSL code), and transmit the user input back to the DBS 402 for dissemination to the appropriate components of the DBS 402, in particular the compiler 407. In some implementations, the client application 446 can use parameters, metadata, and other information received at launch to access a particular set of data from the DBS 402 and/or other components of the EDCS 400. Once a particular client application 446 is launched, a user may interactively process a task, event, or other information associated with the DBS 402 and/or other components of the EDCS 400. For example, the client application 446 can generate and transmit a compilation request to the compiler 407 for received DaSL code in order to receive data for extreme visualization using the client application 446.

In some implementations, the client application 446 can be a native application. In some implementations, the client application 446 can be a general access application, for example a browser (or including) a web browser. Interactions with a compiler 447/407 can be primarily web-based, using, for example, a mobile device's web browser to perform actions on and to consume content from the DBS 402 compiler. In some implementations, the client application 446 can be a native application that provides additional features and/or functions not normally provided on non-native client applications 446. Native applications typically are more closed in nature with tighter security and therefore allow the additional features and/or functionality that a non-native client application 446 is prohibited from providing. For example, a user could access the compiler 407 using a native client application 446 while access to the compiler 447 would be allowed with either the native client application 446 or a non-native client application 446 (e.g., a browser).

In some implementations, the client application 446 can also be used to perform administrative functions related to the compiler 407 and/or database 406. For example, the compiler 407 and/or database 406 can generate and transmit administrative configuration pages to the client application 446.

Further, although illustrated as a single client application 446, the client application 446 may be implemented as multiple client applications in the client 440. For example, there may be a native client application and a web-based (e.g., HTML) client application, and the like depending upon the particular needs of the client 440.

Compiler 447 can, in some implementations, be similar in functionality to compiler 407. Compiler 447 can be used instead of or in conjunction with compiler 407 depending on the particular need and/or desires of the EDCS 400. For example, compiler 447 can perform syntax checking and pre-compilation of received DaSL code and then pass it to compiler 407 for conversion to L code for execution on the database 406. In another example, compiler 447 can perform complete compilation of received DaSL code into L code and pass the L code to either the compiler 407 to transmit to the database 406 or directly to the database 406.

The interface 449 is used by the client 440 for communicating with other computing systems in a distributed computing system environment, including within the EDCS 400, using network 430. For example, the client 440 uses the interface to communicate with a DBS 402 as well as other systems (not illustrated) that can be communicably coupled to the network 430. The interface 449 may be consistent with the above-described interface 404 of the DBS 402. The processor 444 may be consistent with the above-described processor 405 of the DBS 402. Specifically, the processor 444 executes instructions and manipulates data to perform the operations of the client 440, including the functionality required to send requests to the DBS 402 and to receive and process responses from the DBS 402.

The memory 448 typically stores objects and/or data associated with the purposes of the client 440 but may also be consistent with the above-described memory 406 of the DBS 402 or other memories within the EDCS 400 and be used to store data similar to that stored in the other memories of the EDCS 400 for purposes such as backup, caching, and the like.

Further, the illustrated client 440 includes a GUI 442 that interfaces with at least a portion of the EDCS 400 for any suitable purpose. For example, the GUI 442 (illustrated as associated with client 440a) may be used to view data associated with the client 440, the DBS 402, or any other component of the EDCS 400. In particular, in some implementations, the client application 446 may act as a GUI interface for the compiler 407/database 406 to visualize large data sets stored in the database. For example, the GUI 442 can be used, in some implementations, to received DaSL code, transmit the DaSL code to compiler 407, received responsive data sets from DBS 402, and display/visualize the received data sets.

There may be any number of clients 440 associated with, or external to, the EDCS 400. For example, while the illustrated EDCS 400 includes one client 440 communicably coupled to the DBS 402 using network 430, alternative implementations of the EDCS 400 may include any number of clients 440 suitable to the purposes of the EDCS 400. Additionally, there may also be one or more additional clients 440 external to the illustrated portion of the EDCS 400 that are capable of interacting with the EDCS 400 using the network 430. Further, the term "client" and "user" may be used interchangeably as appropriate without departing from the scope of this disclosure. Moreover, while the client 440 is described in terms of being used by a single user, this disclosure contemplates that many users may use one computer, or that one user may use multiple computers.

The illustrated client 440 (example configurations illustrated as 440a-440c) is intended to encompass any computing device such as a desktop computer, laptop/notebook computer, wireless data port, smart phone, personal data assistant (PDA), tablet computing device, one or more processors within these devices, or any other suitable processing device. For example, the client 440 may comprise a computer that includes an input device, such as a keypad, touch screen, or other device that can accept user information, and an output device that conveys information associated with the operation of the DBS 402 or the client 440 itself, including digital data, visual and/or audio information, or a GUI 442, as illustrated specifically with respect to the client 440a.

FIG. 5 is a sequence diagram illustrating a method 500 for enabling extreme visualization for large data sets stored in a database according to an implementation. For clarity of presentation, the description that follows generally describes method 500 in the context of FIGS. 1-4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

Context

A user accesses a BI tool 409 for example from a client 140 using a mobile application or using a web browser. The BI tool 409 typically has both a client portion (remote/associated with the client 440 and/or client application 446) and a server portion in the DBS 402, although in some implementations, the tool can exist solely on the DBS 402 or other component of the EDCS 400 and be accessed by the client 440. The BI tool 409 uses DaSL queries to express business questions to the database 406. In the presented example, the DaSL compiler (e.g., compiler 407) is executing on the DBS 402. In other implementations, the DaSL compiler can run wholly or partially on the client-side on client 440 (e.g., compiler 447). Suppose the user logs into the BI tool 409. At this point, the user obtains a list of BI objects (Information Model/database views) that can be exploited.

Method Flow

At 502, the user selects one or more views from the database. From 502, method 500 proceeds to 504.

At 504, the client-side BI tool component transmits a request to the server-side BI tool component for an input schema to supply to the DaSL compiler and an outline of metadata of the database views. From 504, method 500 proceeds to 506.

At 506, the server-side BI tool component transmits the request to the model extractor to extract the desired input schema and metadata outline of the database views. From 506, method 500 proceeds to 508.

At 508, the requested data is queried from the database process and response data passed back to the client-side BI tool component where the metadata is displayed as an outline (e.g., in a web browser, mobile app, client application, etc.). The DaSL input schema becomes available on the BI tool (server side). From 508, method 500 proceeds to 510.

At 510, the user drags and drops objects from the displayed outline using a client-side user interface (e.g., web browser, mobile application, etc.). From 510, method 500 proceeds to 512.

At 512, the server-side BI tool component will create an instance of the DaSL compiler based upon the received input schema passed from the client-side BI tool component. From 512, method 500 proceeds to 514.

At 514, the server-side BI tool component will generate a DaSL query that corresponds to the objects that were dragged and dropped by the user. The DaSL query is sent to the DaSL compiler. From 514, method 500 proceeds to 516.

At 516, the server-side BI tool component requests that the generated DaSL query be compiled. From 514, method 500 proceeds to 518.

At 518, the DaSL compiler returns a calculation plan (a native query model for the database). In some implementations, a calculation plan is actually a graph (e.g., a directed acyclic graph (DAG)) that represents the processing flow, where each node represents an operation that needs to be executed by the database. The root nodes of the DAG (nodes having no incoming edges—only outgoing edges) are usually database tables or views. The leaves of the DAG (only incoming edges—no outgoing edges) are where the results of the processing are collected. The operations can be simple such as relational algebra Joins, Projections, Selections, or more complex, such as procedures implemented using L-script. The calculation plan is processed by a database calculation engine associated with the database using cursors that will be used to render the results. A database cursor is a control structure used for traversal over records in a database table. Applying operations like "next" and "previous" make the cursor go from one row to the next, or to go back to a previous. The execution of a calculation plan may result in several tables, with inter-table relationships between columns. In this case, it is said that the corresponding cursors are "synchronized"—there is a relationship between the cursors of the two tables, so that the change in the state of one cursor will trigger a change in the state of the other. Although illustrated as being returned in JSON, the calculation plan/cursors can be returned in any appropriate format. From 518, method 500 proceeds to 520.

At 520, the server-side BI tool component sends the Calculation Plan to the database which returns a dataset based on the received Calculation Plan. From 520, method 500 proceeds to 522.

At 522, the returned dataset and topology of the cursors are sent to the client-side BI tool to be visualized in a visualization widget. The client-side BI tool initializes visualization of the dataset using the topology cursors with the visualization widget. After 522, method 500 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a request for an input schema to feed to a data specification language (DaSL) and a metadata outline of typed objects exposed by a database view identified in the request, the database view associated with the database selected using a graphical user interface;
requesting extraction of the input schema and metadata outline from the database;
creating an instance of a DaSL compiler based upon the input schema;
generating, by a computer, a DaSL query corresponding to objects selected from the metadata outline, the DaSL query including low-level primitive queries compiled into a computing language construct supported by the database, mapped to a specific DaSL operator, dynamically compiled at query runtime, and executed to retrieve data from the database conforming to the request;
requesting compilation of the DaSL query;
receiving a calculation plan and topology cursors responsive to the compilation of the DaSL query; and
initiating visualization of a dataset responsive to the execution of the calculation plan using the topology cursors.

2. The method of claim 1, wherein the extraction of the input schema and metadata outline is performed by a model extraction component.

3. The method of claim 1, further comprising transmitting the metadata outline for display.

4. The method of claim 1, further comprising compiling the DaSL query into the calculation plan and topology cursors used to visualize data.

5. The method of claim 1, further comprising executing the calculation plan in the database.

6. A non-transitory, computer-readable medium storing computer-readable instructions executable by a computer and operable to:
receive a request for an input schema to feed to a data specification language (DaSL) and a metadata outline of typed objects exposed by a database view identified in the request, the database view associated with the database selected using a graphical user interface;
request extraction of the input schema and metadata outline from the database;
create an instance of a DaSL compiler based upon the input schema;
generate a DaSL query corresponding to objects selected from the metadata outline, the DaSL query including low-level primitive queries compiled into a computing language construct supported by the database, mapped to a specific DaSL operator, dynamically compiled at query runtime, and executed to retrieve data from the database conforming to the request;
request compilation of the DaSL query;
receive a calculation plan and topology cursors responsive to the compilation of the DaSL query; and
initiate visualization of a dataset responsive to the execution of the calculation plan using the topology cursors.

7. The medium of claim 6, wherein the extraction of the input schema and metadata outline is performed by a model extraction component.

8. The medium of claim 6, further comprising instructions operable to transmit the metadata outline for display.

9. The medium of claim 6, further comprising instructions operable to compile the DaSL query into the calculation plan and topology cursors used to visualize data.

10. The medium of claim 6, further comprising instructions operable to execute the calculation plan in the database.

11. A system, comprising:
at least one computer interoperably coupled with a memory storage and configured to:
receive a request for an input schema to feed to a data specification language (DaSL) and a metadata outline of typed objects exposed by a database view identified in the request, the database view associated with the database selected using a graphical user interface;
request extraction of the input schema and metadata outline from the database;
create an instance of a DaSL compiler based upon the input schema;
generate a DaSL query corresponding to objects selected from the metadata outline, the DaSL query including low-level primitive queries compiled into a computing language construct supported by the database, mapped to a specific DaSL operator, dynamically compiled at query runtime, and executed to retrieve data from the database conforming to the request;

request compilation of the DaSL query;

receive a calculation plan and topology cursors responsive to the compilation of the DaSL query; and initiate visualization of a dataset responsive to the execution of the calculation plan using the topology cursors.

12. The system of claim 11, wherein the extraction of the input schema and metadata outline is performed by a model extraction component.

13. The system of claim 11, further configured to transmit the metadata outline for display.

14. The system of claim 11, further configured to compile the DaSL query into the calculation plan and topology cursors used to visualize data.

15. The system of claim 11, further configured to execute the calculation plan in the database.

* * * * *